Aug. 25, 1931.   H. T. POWELL   1,820,828
GAME INDICATOR
Filed Feb. 5, 1931   2 Sheets-Sheet 1
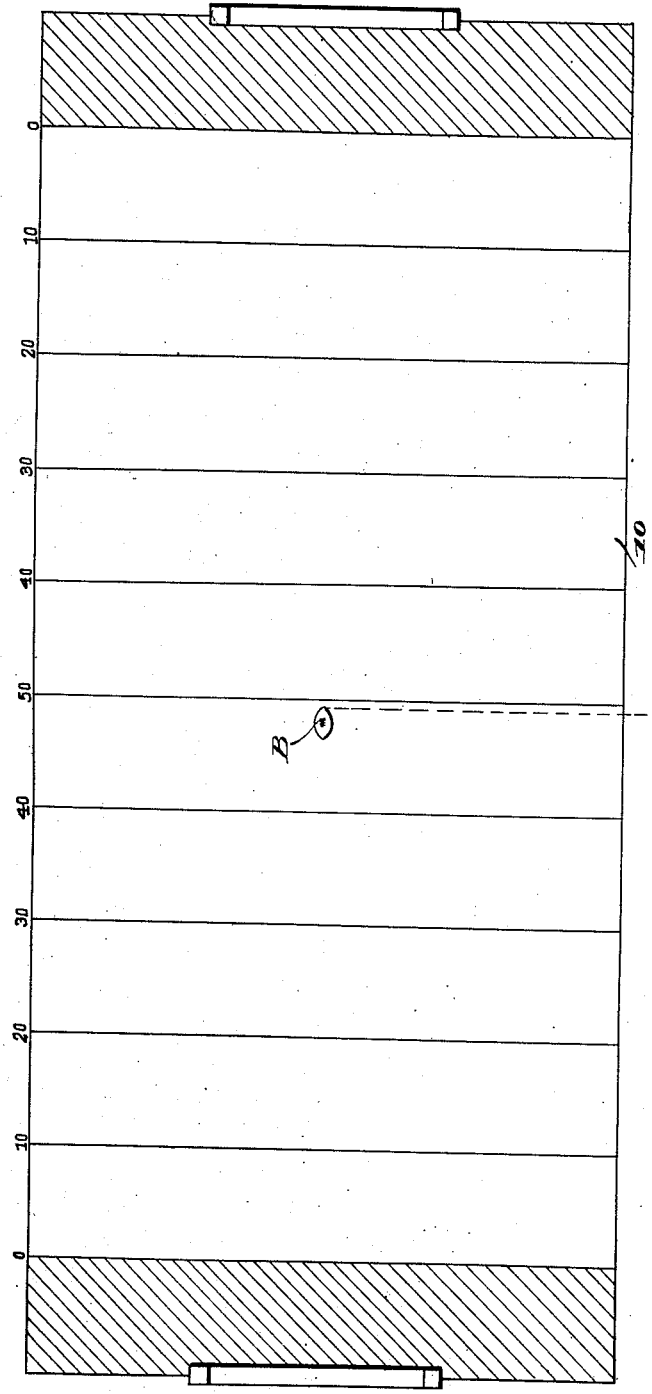
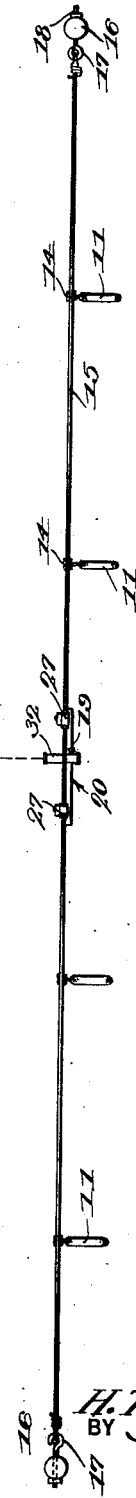
INVENTOR
H. T. Powell
BY
ATTORNEY Aug. 25, 1931.  H. T. POWELL  1,820,828
GAME INDICATOR
Filed Feb. 5, 1931  2 Sheets-Sheet 2
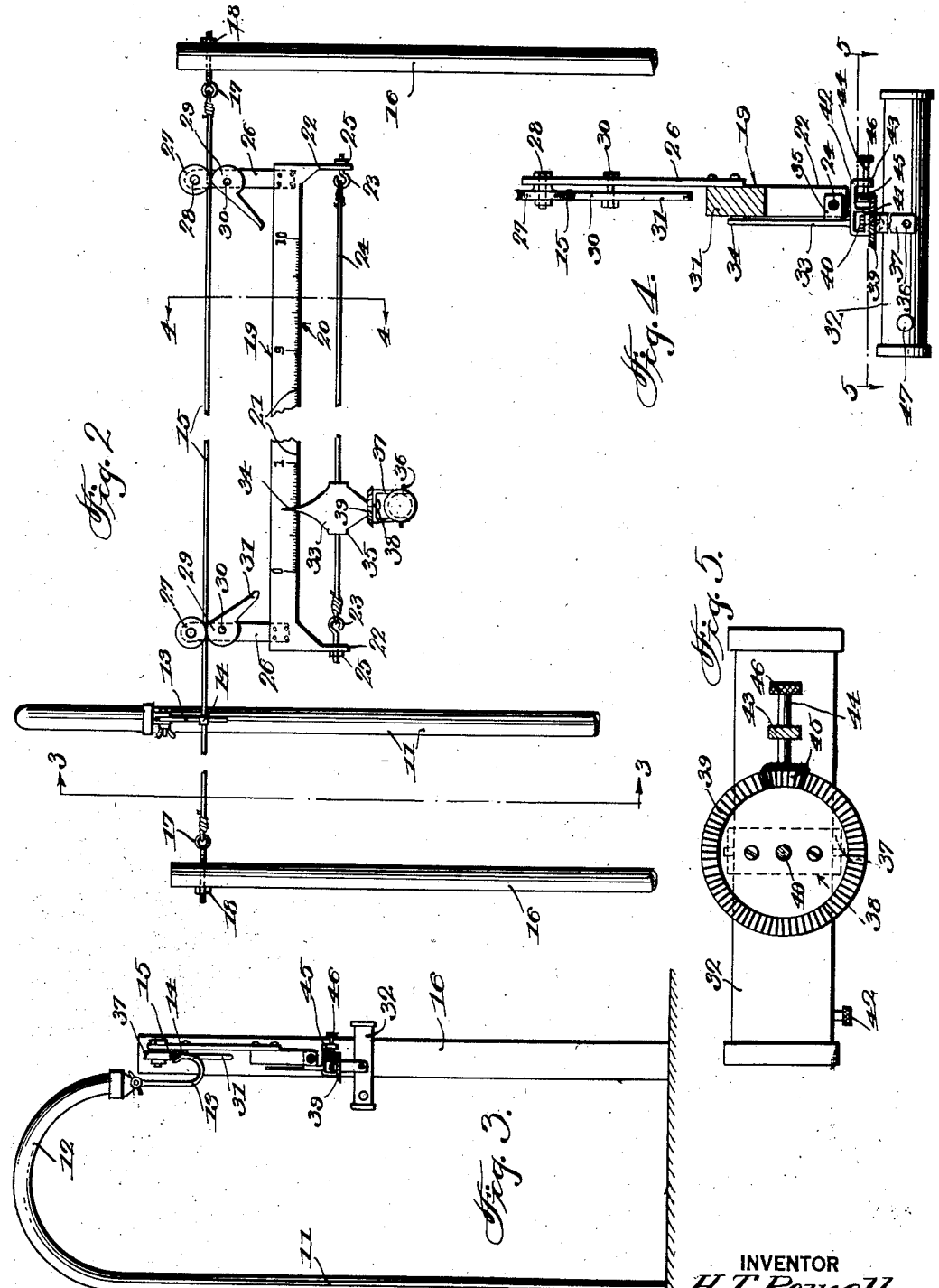
INVENTOR
H. T. Powell
BY
ATTORNEY Patented Aug. 25, 1931

1,820,828

UNITED STATES PATENT OFFICE

HENRY T. POWELL, OF LOUISVILLE, KENTUCKY

GAME INDICATOR

Application filed February 5, 1931. Serial No. 513,711.

My invention relates to game indicators, and more particularly to a device for determining the exact position of a football in play, and it consists in the constructions, arrangements and combinations herein described and claimed.

It is an object of my invention to provide an indicator device which is mounted adjacent the field, and which may be moved into a position to accurately determine the "gain" of the football.

It is a further object of my invention to provide an indicator device which is inexpensive to manufacture and which may be quickly and readily installed upon a field.

A still further object of the invention is the provision of means for suspending the indicator device, as well as means for locking the indicator device in any desired position upon such suspension means.

Additional objects, advantages and features of invention will be apparent from the following description considered in conjunction with the accompanying drawings wherein;

Figure 1 is a plan view of a football field equipped with my indicator device.

Figure 2 is a side elevation of my indicator device, illustrating the means of suspension.

Figure 3 is an end view on the line 3—3 of Fig. 2.

Figure 4 is a cross section on the line 4—4 of Fig. 2.

Figure 5 is a cross section on the line 5—5 of Fig. 4.

In the drawings, the reference character 10 represents a usual football field and adjacent one side thereof I provide a plurality of posts 11, the upper ends of which are bent downwardly as at 12, and upon the ends thereof pivoted hangers 13 are secured. The hangers 13 have their free ends bent upwardly and terminate in a fork 14 within which a suspension wire 15 is seated.

At the ends of the field 10 upstanding posts 16 are positioned and have eye bolts 17 secured therein. The respective ends of the wire 15 are fastened in the eye bolts and the tension of this wire may be varied by tightening the nuts 18.

As shown, the posts 16 are positioned at the extreme ends of the field 10, and it will, of course, be understood that this is immaterial and may be varied as desired, but the indicator should be so located as to avoid interference of play on the field.

Upon the cable 15 there is suspended an indicator device represented by the reference character 19, which is adjustable longitudinally upon the wire 15 for a purpose to be hereinafter explained.

The indicator device 19 comprises a body member 20 having a flat scale portion 21, which in the present instance is marked off in yards and fractions thereof from 0 to 10 yards. Formed integrally with the scale 21, depending leg members 22 are formed at the ends thereof, being suitably apertured to receive eye bolts 23. A wire 24 is attached to each eye bolt 23 and may be suitably tensioned by manipulating the nuts 25.

Upon opposite ends of the scale member 21 upwardly extending hangers 26 are secured, and each hanger includes a grooved traction roller 27 rotatably mounted upon a pintle 28, permitting movement of the member 20 along the cable 15.

In order that the indicator device 19 may be secured in any desired position upon the cable 15, cams 29 are mounted upon pivots 30, immediately beneath the rollers 27. The cams 29 are so shaped as to permit free rolling movement of the indicator 19 upon the cable 15, and yet, by manipulating the lever 31 of the cam the binding action between the rollers 27, the cable 15 and cams 29 will effectively retain the indicator device in any desired position upon the cable.

Slidably mounted upon the cable 24 there is a telescope or similar device 32 suspended from an indicator member 33 having a pointer 34 disposed over the scale member 21 and adapted to cooperate with the scale thereof. Any suitable manner of mounting the member 33 upon the cable may be employed, but in the present instance I have shown a pair of right angular extended apertured ears 35, through which the cable 24 passes.

The telescope 32 is vertically swingable upon trunnions 36 engaged in leg members 37 of a saddle 38. Upon the upper surface of the saddle 38 there is fixed a bevelled gear 39, and through the saddle 38 and gear 39 there is journalled a pivot 40. The bolt 40 is extended through a bracket 41 formed upon the lower portion of the indicator 33 and by this construction, it will be apparent that the telescope 32 is suspended from the indicator 33.

The bracket 41 is provided with an extension 42 which is bent downwardly at right angles to provide a bearing 43. Journalled within the bearing 43 there is a shaft 44 upon one end of which is keyed a small bevelled gear 45, which is in mesh with the gear 39. The opposite end of the shaft 44 has a knurled operating head 46, whereby the telescope 32 may be adjusted with respect to the field. In use, the telescope 32 must be positioned exactly 90° to the field, and this position may be accurately attained by manipulation of the gears 39 and 45 through the operating head 46.

In operation, with my indicator device mounted adjacent a football field and extending parallel to one side line thereof, the football B is put in play, and it is desired to determine exactly what amount of "gain" has been made by one of the teams. Attention is now invited to Fig. 1 of the drawings, wherein it will be seen that the ball B is lying to the left of the 50 yard mark. We will say, as an illustration, that the indicator device 19 has been secured upon the cable 15 midway of the field. The head linesman will slide the telescope upon the cable 24 until it is in direct line with the nose of the ball B. Such movement of the telescope 32 will correspondingly move the pointer 34 along the scale 21, and will thus indicate exactly the gain in yards or fractions thereof.

The telescope 32 may include means 47 for securing the proper focus, and also, it should be noted that the telescope is pivotally mounted in the saddle 38 so as to permit up and down swinging movement thereof in order to sight the ball regardless of its position upon the field.

There will be times, of course, when the ball will be carried to extreme ends of the field, and under such circumstances the levers 31 are operated to release the cams 29, permitting the indicator 19 as an entirety to be slid along the cable 15 to a position opposite the ball. When the indicator has been moved to such position the levers 31 are operated to again clamp the cable 15. The telescope 32 is then sighted as previously described to determine the movement of the ball.

From the foregoing it will be apparent that I have provided an indicator which may be operated to accurately determine the movement of a ball upon a field, and one which is of simple construction and readily manipulated so as to avoid delays in a game as usually involved by measurements made by linesmen heretofore.

While I have shown and described a preferred construction, it will be apparent that modifications thereof may be made, as fairly fall within the scope of the appended claims.

What is claimed is:—

1. The combination of a game field and movable game piece, and a scale device movably supported upon said field for determining the amount of movement of said game piece.

2. The combination of a game field and movable game piece, a sighting device longitudinally movable along said field and said sighting device having a scale for indicating the movement of said game piece upon said field.

3. The combination of a game field and movable game piece, a cable suspended along one longitudinal side thereof, a scale member adjustable on said cable, a sight device slidably mounted upon said scale member for sighting said game piece, and said sight device having a pointer for coordination with said scale member to indicate movement of said game piece.

4. An indicator for games or the like comprising a cable, a support therefor, a scale member longitudinally adjustable upon said cable, means for locking said scale in adjusted positions upon said cable, and said scale having a sight device slidably suspended therefrom.

5. An indicator for football games or the like comprising a cable, a support therefor, a scale member, said scale member having upstanding arms, grooved rollers mounted thereon and adapted to traverse said cable, cam members pivotally mounted upon said arms and disposed beneath said cable to lock said scale in adjusted positions upon said cable, a sight device slidably mounted upon said scale and said sight device having a pointer for cooperation with said scale to indicate the movement of a football after play.

6. An indicator for football games or the like comprising a cable, a support therefor, a scale member, said scale member having upstanding arms, grooved rollers mounted thereon and adapted to traverse said cable, cam members pivotally mounted upon said arms and disposed beneath said cable to lock said scale in adjusted positions upon said cable, a sight device slidably mounted upon said scale, means for adjusting said sight device at right angles to said scale, and said sight device having a pointer for cooperation with said scale to indicate the movement of a football upon a playing field.

7. An indicator for games or the like comprising a cable, a support therefor, a scale member longitudinally adjustable upon said cable, means for locking said scale in adjusted positions upon said cable, said scale having a pair of downwardly depending arms, a cable suspended therebetween, means for tensioning said cable, and a sight device slidably mounted upon said last named cable, said sight device having a pointer cooperative with said scale for indicating the amount of movement of a game piece when said sight device has been moved to align with said game piece.

8. In combination, a game field and movable game piece, a cable suspended along one longitudinal side thereof, a scale member, said scale member having upstanding arms, grooved rollers mounted thereon, and adapted to traverse said cable, cam members pivotally mounted upon said arms and disposed beneath said cable to lock said rollers and cables together, a sight device longitudinally slidable upon said scale and adjustable with respect to said field, and said sight device having a pointer for cooperation with said scale to indicate the movement of said game piece.

HENRY T. POWELL.